(12) United States Patent
Kang et al.

(10) Patent No.: US 11,683,417 B2
(45) Date of Patent: Jun. 20, 2023

(54) INCOMING REQUEST BLENDING FOR CUSTOMER SERVICE REPRESENTATIVES

(71) Applicant: COUPANG CORP., Seoul (KR)

(72) Inventors: Dae Sung Kang, Seoul (KR); Myung Sun Cha, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/491,257

(22) Filed: Sep. 30, 2021

(65) Prior Publication Data

US 2022/0191325 A1 Jun. 16, 2022

Related U.S. Application Data

(63) Continuation of application No. 17/117,179, filed on Dec. 10, 2020, now Pat. No. 11,165,907.

(51) Int. Cl.
*H04M 3/00* (2006.01)
*H04M 3/51* (2006.01)
(Continued)

(52) U.S. Cl.
CPC ...... *H04M 3/5141* (2013.01); *G06Q 30/0281* (2013.01); *H04M 3/5175* (2013.01); *H04M 3/5233* (2013.01); *H04M 3/5237* (2013.01)

(58) Field of Classification Search
CPC ............. H04M 3/5141; H04M 3/5175; H04M 3/5233; H04M 3/5237; G06Q 30/0281
(Continued)

(56) References Cited

U.S. PATENT DOCUMENTS 6,173,052 B1 9/2001 Brady
9,787,840 B1 * 10/2017 Neuer, III ........... H04M 3/5158
(Continued)

FOREIGN PATENT DOCUMENTS

CN 107426448 A 12/2017
CN 109155020 A 1/2019
(Continued)

OTHER PUBLICATIONS

Office Action in counterpart Taiwanese Application No. 110116925 dated Feb. 23, 2022 (26 pages).
(Continued)

*Primary Examiner* — William J Deane, Jr.
(74) *Attorney, Agent, or Firm* — Finnegan, Henderson, Farabow, Garrett & Dunner LLP

(57) ABSTRACT

Embodiments of the present disclosure include computer-implemented systems and methods for routing incoming customer requests or inquiries in a customer service center. The system may include at least one processor configured to execute instructions to perform steps. The steps may include receiving a plurality of incoming customer calls and a plurality of incoming customer chat sessions. The steps may include blending the received plurality of customer calls and the received plurality of customer chat sessions into a total queue for presentation to at least one user device. The steps may additionally include determining a respective priority for each of the blended plurality of customer calls and the blended plurality of customer chat sessions and sending, based on the determined priority, to the at least one user device at least one of the blended plurality of customer calls or the blended plurality of customer chat sessions.

20 Claims, 10 Drawing Sheets

(51) Int. Cl.
*H04M 3/523* (2006.01)
*G06Q 30/02* (2023.01)

(58) Field of Classification Search
USPC ....... 379/265.01–265.14, 266.01–266.1, 309
See application file for complete search history.

(56) References Cited

U.S. PATENT DOCUMENTS

| | | | |
|---|---|---|---|
| 2006/0203993 | A1 | 9/2006 | Busey et al. |
| 2009/0122972 | A1 | 5/2009 | Kaufman et al. |
| 2009/0122973 | A1* | 5/2009 | Jay .................... H04M 3/5237 379/266.01 |
| 2017/0111503 | A1* | 4/2017 | McGann ............. H04M 3/5235 |
| 2017/0118342 | A1* | 4/2017 | Barnett .................. H04L 67/02 |
| 2018/0309801 | A1* | 10/2018 | Rathod ............... H04M 3/5175 |
| 2019/0052701 | A1* | 2/2019 | Rathod ............... H04L 12/1827 |
| 2020/0050796 | A1* | 2/2020 | Lacey ................ G06Q 30/0251 |
| 2020/0244806 | A1* | 7/2020 | Shah .................... H04M 3/5232 |
| 2021/0392227 | A1* | 12/2021 | Li ....................... H04M 3/5175 |

FOREIGN PATENT DOCUMENTS

| | | |
|---|---|---|
| KR | 10-1103786 B1 | 1/2012 |
| KR | 10-2016-0132329 | 11/2016 |
| KR | 10-2020-0063282 A | 6/2020 |
| KR | 10-2020-0107710 | 9/2020 |
| KR | 10-2020-0107710 A | 9/2020 |

OTHER PUBLICATIONS

Notice of Preliminary Rejection, dated Nov. 22, 2021, in counterpart Korean Patent Application No. 10-2021-7019352, dated Jun. 22, 2021 (10 pages).

International Search Report and Written Opinion in counterpart application PCT/IB2020/062029 dated Sep. 6, 2021 (8pages).

* cited by examiner

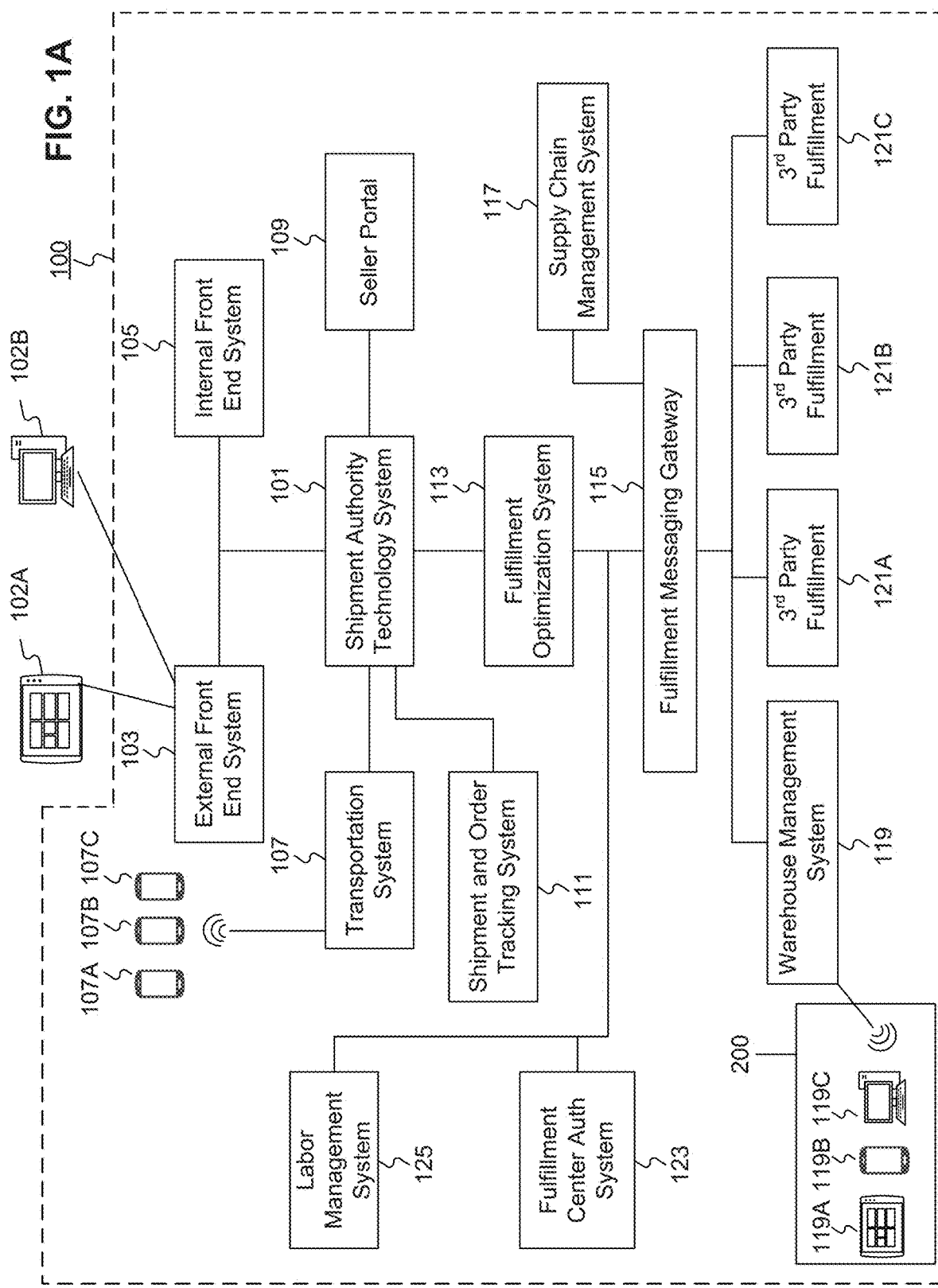

INCOMING REQUEST BLENDING FOR CUSTOMER SERVICE REPRESENTATIVES

This application is a Continuation of U.S. application Ser. No. 17/117,179, filed Dec. 10, 2020, the contents of which is incorporated herein by reference in its entirety to provide continuity of disclosure

TECHNICAL FIELD

The present disclosure generally relates to computerized systems and methods for routing customer requests and inquiries. In particular, embodiments of the present disclosure relate to inventive and unconventional systems and methods for routing incoming customer requests and inquiries in a customer service center to the most appropriate customer service representative or customer service group.

BACKGROUND

With the advancement and widespread acceptance of e-commerce, Internet shopping offers a one-stop shop for all shopping needs including food, furniture, electronics, clothes, books, etc. Due to accessibility and ease of internet shopping, large volumes of products are purchased and sold. In order to aid the process of purchasing items online and to handle any issues that may arise, customer service centers act as an intermediate between buyers and sellers. Customers may contact a customer service center for information on a product, correct an error associated with an order, make an order, sign up for memberships, etc.

Customer service centers may include any number of customer service groups or customer service representatives. In a typical customer service center, customer inquiries or requests may be received in the form of phone calls, internet chats, emails, Q & A inquiries, etc. Each of these inquiry types may be placed in a type specific queue and delivered to the next available representative using a first-in-first-out model. That is, the first call to come in is the first one to be assigned to a customer service representative assigned to answer calls. However, because the inquiries come in over multiple communication channels, certain channels may become overwhelmed, while other channels are relatively empty. This leads to representatives assigned to one channel being overworked and stressed while representatives assigned to other channels may sit idle.

What is needed is a system that accepts all communication channel types and allows for smart routing of incoming inquires to the best suited customer service representative. As such, if the amount of incoming inquiries to a specific channel increases, the surplus manpower of other channels may handle the inflow. That is, the surplus may be reassigned to other customer service representatives. Such a system increases productivity of customer service representatives, reduces wait times for customers, and makes for a more efficient customer service center.

Therefore, there is a need for improved methods and systems for routing incoming customer requests.

SUMMARY

One aspect of the present disclosure is directed to a computer-implemented system for routing incoming customer requests. The system may include a memory comprising instructions and at least one processor configured to execute the instructions to perform step. The steps may include receiving a plurality of incoming customer calls and a plurality of incoming customer chat sessions and blending the received plurality of customer calls and the received plurality of customer chat sessions into a total queue for presentation to at least one user device. The steps may also include determining a respective priority for each of the blended plurality of customer calls and the blended plurality of customer chat sessions. Additionally, the steps may include sending, based on the determined priority, to at least one user device at least one of the blended plurality of customer calls or the blended plurality of customer chat sessions.

Another aspect of the disclosure is directed to a computer-implemented method for routing incoming customer requests. The method may include receiving a plurality of customer calls and a plurality of customer chat sessions and blending the received plurality of customer calls and the received plurality of customer chat sessions into a total queue for presentation to at least one user device. The method may include determining a respective priority for each of the blended plurality of customer calls and the blended plurality of customer chat sessions. Additionally, the method may include sending, based on the determined priority, to the at least one user device at least one of the blended plurality of customer calls or the blended plurality of customer chat sessions.

An additional aspect of the disclosure is directed to a computer-implemented system for routing incoming customer requests having at memory comprising processor instructions. The system may include at least one processor configured to execute the instructions to perform steps. The steps may include receiving a plurality of customer calls, a plurality of customer chat sessions, a plurality of mail inquiries, and a plurality of Q & A inquiries and blending the received plurality of customer calls, plurality of customer chat sessions, plurality of mail inquiries, and plurality of Q & A inquiries into a total queue for presentation to at least one user device. The steps may additionally include determining priority of each of the blended plurality of customer calls, plurality of customer chat sessions, plurality of mail inquiries, plurality of Q & A inquires by applying at least one rule or condition and sending, based on the determined priority, to the at least one user device at least one of the blended plurality of customer calls, plurality of customer chat sessions, plurality of mail inquiries, plurality of Q & A inquiries. Furthermore, the steps may include receiving feedback from the at least one user device.

Other systems, methods, and computer-readable media are also discussed herein.

BRIEF DESCRIPTION OF THE DRAWINGS

FIG. 1A is a schematic block diagram illustrating an exemplary embodiment of a network comprising computerized systems for communications enabling shipping, transportation, and logistics operations, consistent with the disclosed embodiments.

DETAILED DESCRIPTION

Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Referring to FIG. 1A, a schematic block diagram 100 illustrating an exemplary embodiment of a network comprising computerized systems for communications enabling shipping, transportation, and logistics operations is shown. As illustrated in FIG. 1A, system 100 may include a variety of systems, each of which may be connected to one another via one or more networks. The depicted systems include a shipment authority technology (SAT) system 101, an external front-end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), 3$^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front-end system 103 and FO system 113.

External front-end system 103, in some embodiments, may be implemented as a computer system that enables external users to interact with one or more systems in network 100. For example, in embodiments where network 100 enables the presentation of systems to enable users to place an order for an item, external front-end system 103 may be implemented as a web server that receives search requests, presents item pages, and solicits payment information. For example, external front-end system 103 may be implemented as a computer or computers running software such as the Apache HTTP Server, Microsoft Internet Information Services (IIS), NGINX, or the like. In other embodiments, external front-end system 103 may run custom web server software designed to receive and process requests from external devices (not depicted), acquire information from databases and other data stores based on those requests, and provide responses to the received requests based on acquired information.

In some embodiments, external front-end system 103 may include one or more of a web caching system, a database, a search system, or a payment system. In one aspect, external front-end system 103 may comprise one or more of these systems, while in another aspect, external front-end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front-end system 103. External front-end system 103 may receive information from systems or devices in network 100 for presentation and/or display. For example, external front-end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front-end system 103 and request a search by entering information into a search box. External front-end system 103 may request information from one or more systems in network 100. For example, external front-end system 103 may request results from FO System 113 that satisfy the search request. External front-end system 103 may also request and receive (from FO System 113) a Promised Delivery Date or "PDD" for each product returned in the search results. The PDD, in some embodiments, represents an estimate of when a package will arrive at the user's desired location if ordered within a particular period of time, for example, by the end of the day (11:59 PM). (PDD is discussed further below with respect to FO System 113.)

External front-end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front-end system 103 may deliver the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front-end system 103. In response, external front-end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front-system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. External front-end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front-end system 103.

Figure 1D:
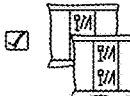
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front-end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front-end system 103.

External front-end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front-end system 103 may send the Order page to the user device.

The user device may enter information on the Order page and click or otherwise interact with a user interface element that sends the information to external front-end system 103. From there, external front-end system 103 may send the information to different systems in network 100 to enable the creation and processing of a new order with the products in the shopping cart.

In some embodiments, external front-end system 103 may be further configured to enable sellers to transmit and receive information relating to orders.

Internal front-end system 105, in some embodiments, may be implemented as a computer system that enables internal users (e.g., employees of an organization that owns, operates, or leases network 100) to interact with one or more systems in network 100. For example, in embodiments where network 101 enables the presentation of systems to enable users to place an order for an item, internal front-end system 105 may be implemented as a web server that enables users to view diagnostic and statistical information about orders, modify item information, or review statistics relating to orders. For example, internal front-end system 105 may be implemented as a computer or computers running software such as the Apache HTTP Server, Microsoft Internet Information Services (IIS), NGINX, or the like. In other embodiments, internal front-end system 105 may run custom web server software designed to receive and process requests from devices depicted in network 100 (as well as other devices not depicted), acquire information from databases and other data stores based on those requests, and provide responses to the received requests based on acquired information.

In some embodiments, internal front-end system 105 may include one or more of a web caching system, a database, a search system, a payment system, an analytics system, an order monitoring system, or the like. In one aspect, internal front-end system 105 may comprise one or more of these systems, while in another aspect, internal front-end system 105 may comprise interfaces (e.g., server-to-server, database-to-database, or other network connections) connected to one or more of these systems.

Transportation system 107, in some embodiments, may be implemented as a computer system that enables communication between devices in network 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature. The mobile device may send a communication to transportation system 107 including information about the delivery, including, for example, time, date, GPS location, photo(s), an identifier associated with the delivery worker, an identifier associated with the mobile device, or the like. Transportation system 107 may store this data in a database (not pictured) for access by other systems in network 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store a relationship between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this relationship in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other outside entities to electronically communicate with other aspects of information relating to orders. For example, a seller may utilize a computer system (not pictured) to upload or provide product information, order information, contact information, or the like, for products that the seller wishes to sell through system 100.

Shipment and order tracking system 111, in some embodiments, may be implemented as a computer system that receives, stores, and forwards information regarding the location of packages ordered by customers (e.g., by a user using devices 102A-102B). In some embodiments, shipment and order tracking system 111 may request or store information from web servers (not pictured) operated by shipping companies that deliver packages ordered by customers.

In some embodiments, shipment and order tracking system 111 may request and store information from systems depicted in network 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual packages inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end-system 103 and/or shipment and order tracking system 111). FO system 113 may also store information describing where particular items are held or stored. For example, some items that customers order may be stored only in one fulfillment center, while other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end-system 103, SAT system 101, shipment and order tracking system 111). In other embodiments, FO system 113 may receive electronic requests from one or more systems (e.g., external front-end system 103, SAT system 101, shipment and order tracking system 111) and calculate the PDD on demand.

Fulfilment messaging gateway (FMG) 115, in some embodiments, may be implemented as a computer system that receives communications from one or more systems in network 100, such as FO system 113, converts the data in the communications to another format, and forward the data in the converted format to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may determine forecasted level of demand for a particular product based on, for example, based on a past demand for products, an expected demand for a product, a network-wide past demand, a network-wide expected demand, a count of products stored in each fulfillment center 200, expected or current orders for each product, or the like. In response to this determined forecasted level and the amount of each product across all fulfillment centers, SCM system 117 may generate one or more purchase orders to satisfy the expected demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with network 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with network 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3$^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly.

Fulfillment Center Auth system (FC Auth) 123, in some embodiments, may be implemented as a computer system with a variety of functions. For example, in some embodiments, FC Auth 123 may act as a single-sign on (SSO) service for one or more other systems in network 100. For example, FC Auth 123 may enable a user to log in via internal front-end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113 through FMG 115, not all embodiments require this particular configuration. Indeed, in some embodiments, the systems in network 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in network 100 may be implemented as one or more virtual servers implemented at a data center, server farm, or the like.

Figure 2:
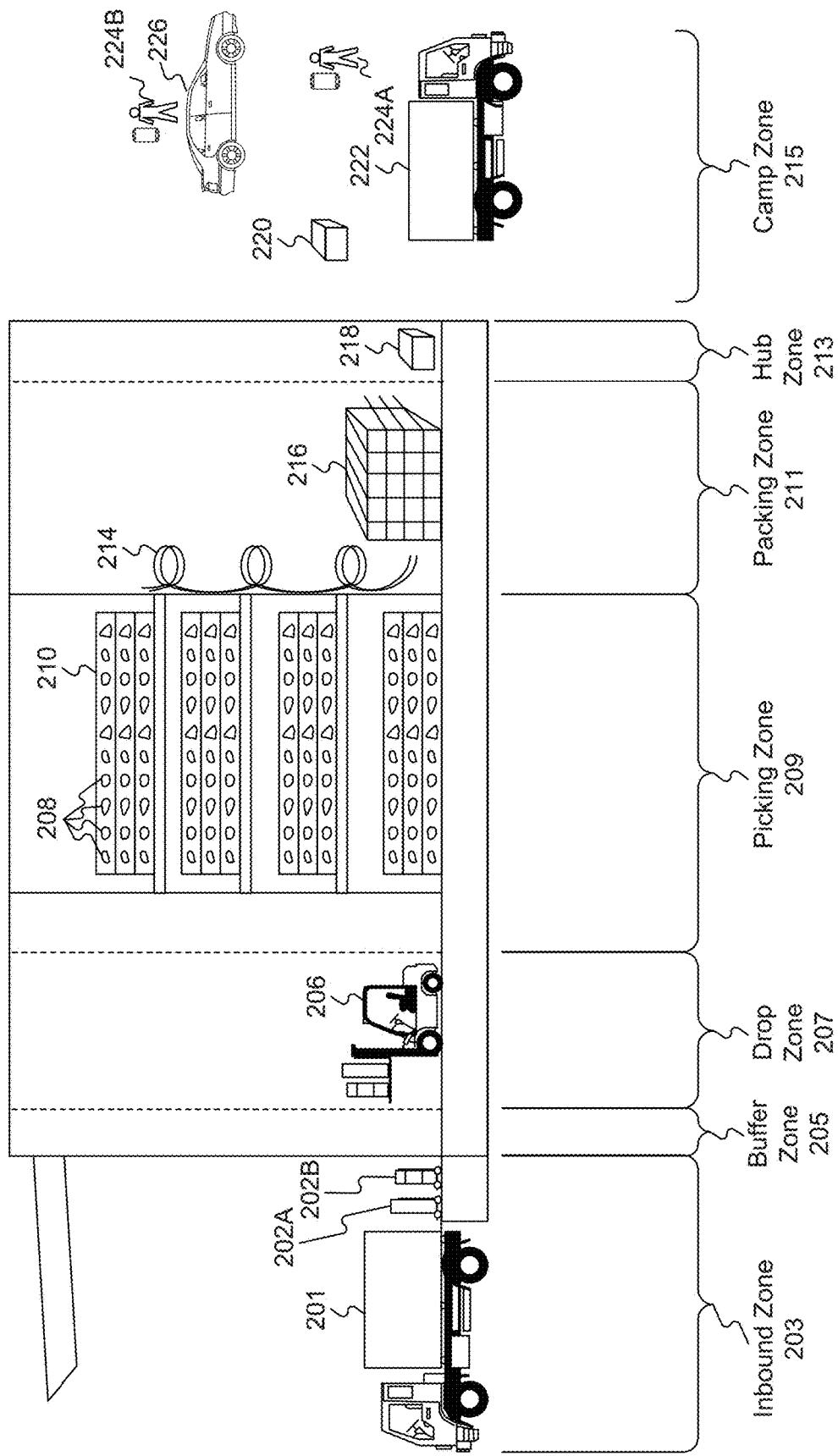
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So, while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using network 100 from FIG. 1. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the drop zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1 indicating that item 202A has been stowed at the location by the user using device 119б.

Once a user places an order, a picker may receive an instruction on device 119б to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
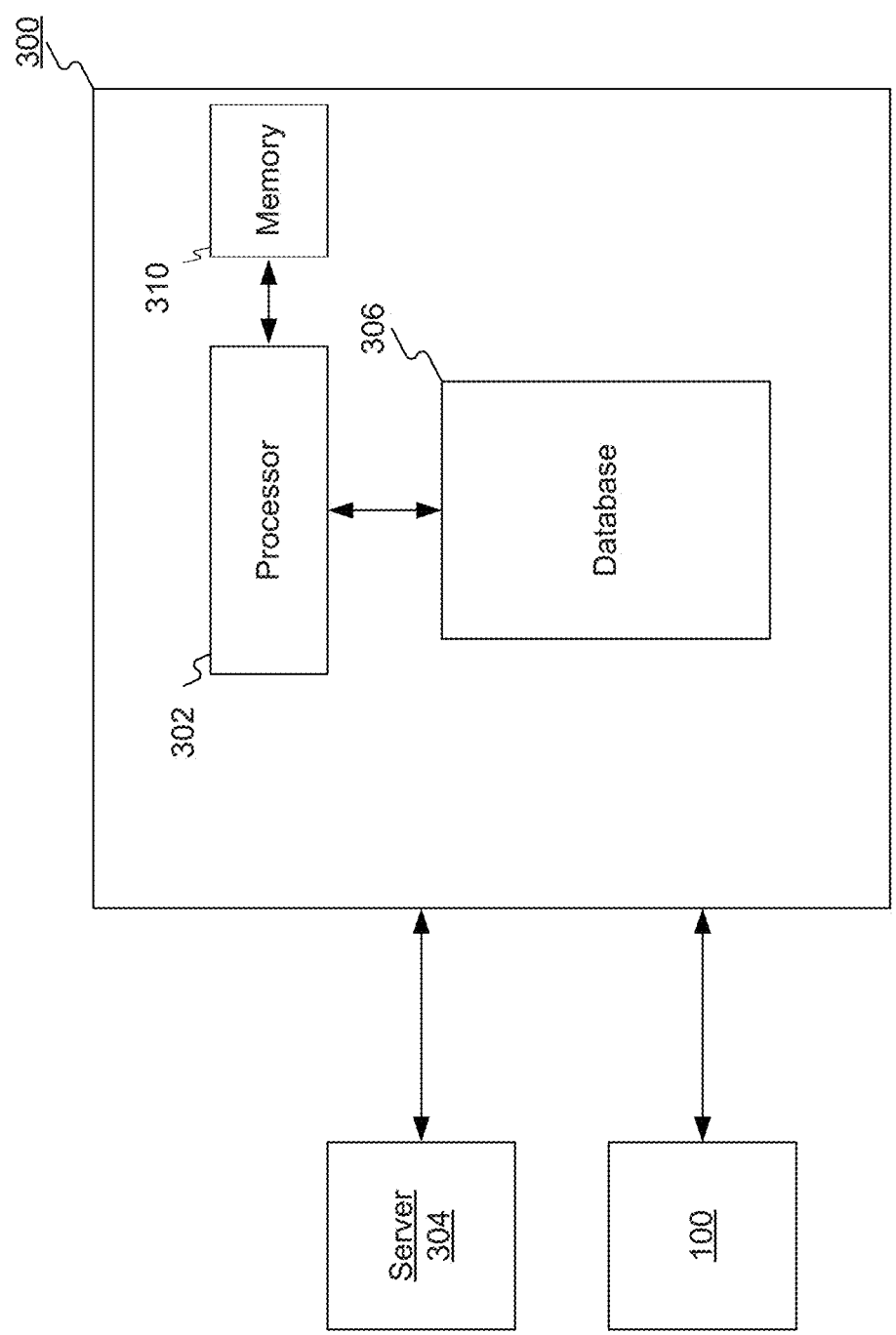
FIG. 3 illustrates a block diagram of an exemplary system 300 for routing incoming customer requests or inquiries in a customer service center, consistent with the disclosed embodiments.

FIG. 3 illustrates a block diagram of an exemplary system 300 for routing incoming customer requests or inquiries in a customer service center, consistent with the disclosed embodiments. System 300 may be separate from, or incorporated into a portion of system 100, such as external front end system 103. System 300 may include one or more processors 302 configured to execute the instructions to perform steps associated with routing incoming customer requests or inquiries. System 300 may include a memory 310 which includes processor instructions.

System 300 may be local to or remote from a customer service center. System 300 may communicate with the customer service center and customer service representatives over any wired or wireless communication channel. Portions of system 300 may reside in the cloud or otherwise be stored online. System 300 may include a database 306. Database 306 may comprise one or more local or remote databases configured to store data associated with customer service groups, customer service representatives, historical data, product information, sales information, benchmarks, rules or conditions, or any data that may be useful in aiding the routing of incoming customer inquiries or requests. For example, database 306 may include skill set information for each customer service group or customer service representative. A customer service group may be one or more customer service representatives assigned a specific task, such as answering all incoming calls, or handling a specific category or type of customer inquiries or requests. Database 306 may be continuously updated (e.g., by system 300, external front end system 103, or internal front end system 105) to include data from current or recently completed sales or customer service representative skill evaluations.

System 300, external front end system 103, or internal front end system 105 may collect sales data, request, or inquiry data and store the data on server 304, in database 306, or in another data storage location for later retrieval. Server 304 may communicate with one or more databases or other memory storage devices. The one or more databases or other memory storage devices may be remote, such as on the cloud, or local. Server 304 may host software, programs, or applications that may allow for system 300 to interact with one or more remote customer service centers. For example, server 304 may be a chat server engine responsible for operating and managing incoming chat inquiries or requests.

Figure 4:
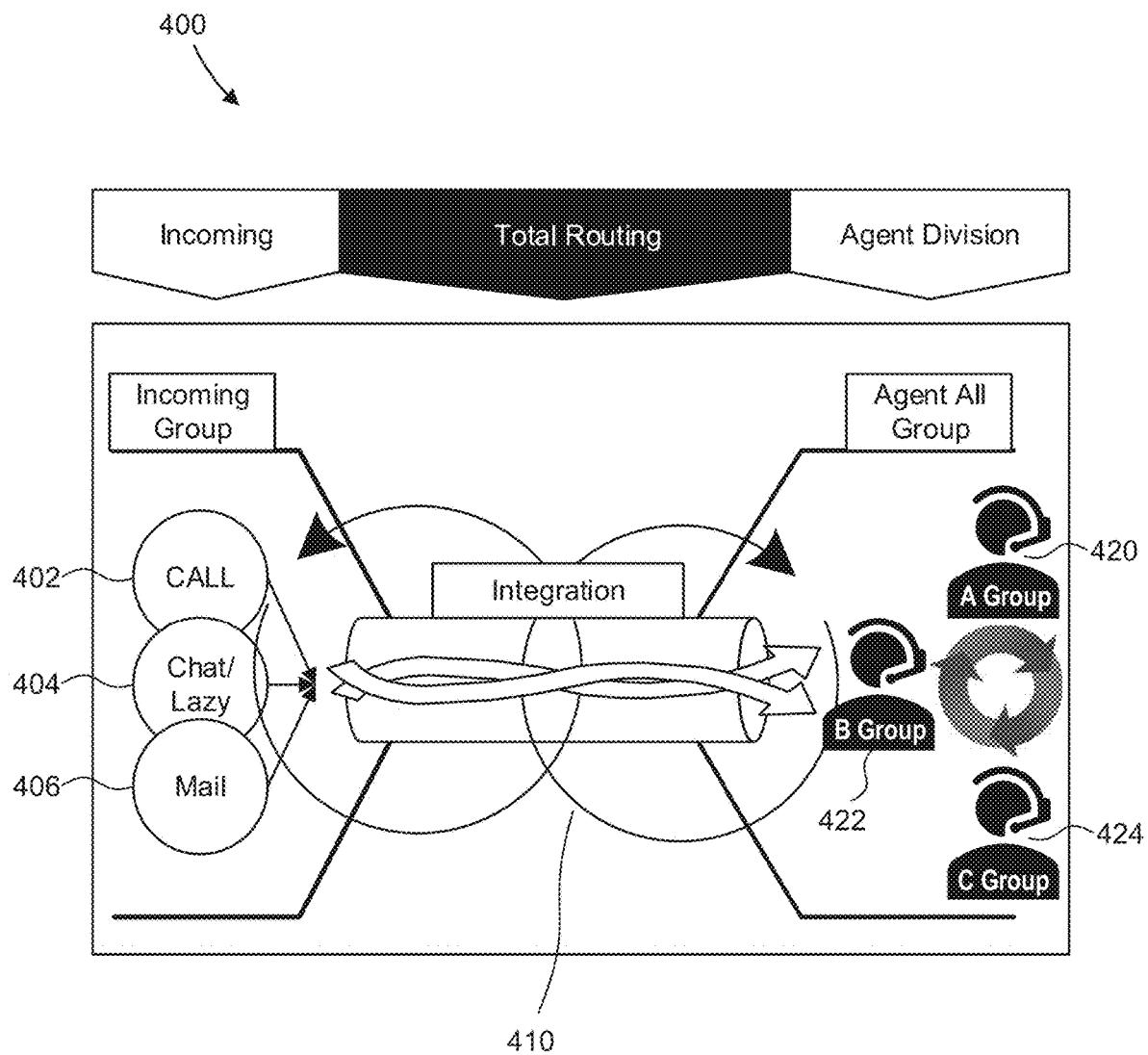
FIG. 4 is a diagram illustrating how system 300 or front end system 103 may perform blending of incoming requests or inquiries to reduce average hold time (AHT), consistent with the disclosed embodiments.

FIG. 4 is a diagram illustrating how system 300 may perform blending of incoming requests or inquiries to reduce average hold time (AHT), consistent with the disclosed embodiments. Average hold time is the amount of time between when the system 300 may place a customer on hold until the moment a customer service representative becomes available or the customer hangs up. The average hold time may be calculated by adding up all inbound customer call hold times and dividing that by the number of inbound customer calls answered by a customer service representative or interactive voice response system (IVR). Customer inquiries are received though various channels such as non-real-time email, mail, SNS, VOC as well as real-time channels. As illustrated in FIG. 4, system 300 may accept all communication channel types. For example, FIG. 4 illustrates incoming requests or inquires in the form of phone calls 402, chat sessions 404, or email, mail, and other Q & A inquiries 406. Phone calls 402 and chat sessions 404 are handled by customer service representatives in real-time while emails or other Q & A inquiries 406 may be handled at a time later than when submitted by a customer.

The requests or inquiries 402, 404, 406 may be integrated (illustrated at 410) from the various channels and blended to form a total queue containing all incoming inquiries. Blending of all requests or inquiries 402, 404, 406 allows for all communication channels to operate on a single platform and may include making each type of request or inquiry recognizable, configurable, or searchable by at least one processor. Phone calls 402, chat sessions 404, email, mail, and other Q & A inquiries 406 may be received by system 300 over any wired or wireless communication channel. Phone calls 402 may be received from any land based phone line, cellular phone, voice-over-IP, smart phone, smart device, or from any other channel that allows two remote parties to vocally communicate in real-time. Chat sessions 404 may be received from any computing system or interface that allows for text based or other messages to be sent from one party for display on a user device associated with a second party. For example, chat sessions 404 may include SMS (short message service), direct messages, team chat rooms, chat bots, or any other messaging system allowing for real-time written conversation. Emails, mail, or other Q & A inquiries or request may arrive from any computing device having access to the internet or otherwise sending or receiving email or mail messages.

When the amount of inflow to a specific channel increases, the surplus manpower of other channels may handle the inflow. The surplus may be able to be reassigned to other customer service representatives. For example, in FIG. 4 group A of customer service representatives 420 may typically be assigned incoming calls 402, while group B 422 is typically assigned incoming chats 404, and group C 424 may typically be assigned answering emails or other Q & A inquiries 406. If more calls 402 are received than can be handled by the customer service representatives in group A 420, then the system may route some of the calls to customer service representatives in group B 422, group C 424, or both group B 422 and group C 424. Customer service groups may include one or more customer service representatives. Each group may be associated with a specific task or groups of tasks. Furthermore, each group may be divided up or segmented in any manner, such as, by skill set, or by category or type of inquiry or request. For example, as noted above, group A 420 may be assigned incoming calls 402. However, group A 420 may be segmented to include a first set of representatives assigned to receive all phone calls related to refund requests, a second set of representatives to receive all phone calls related to product information inquiries, a third set of representatives to receive all phone calls related to purchasing items, and a fourth set of representatives to handle all other phone calls. Additionally, each group may include one or more representatives that "flex" between each of the groups. These representatives may have skill sets that allow them to handle any inquiry or request that comes received by system 300. As further discussed below, routing the incoming inquires to various customer service representatives may be guided by following a set of rules or conditions.

Figure 5:
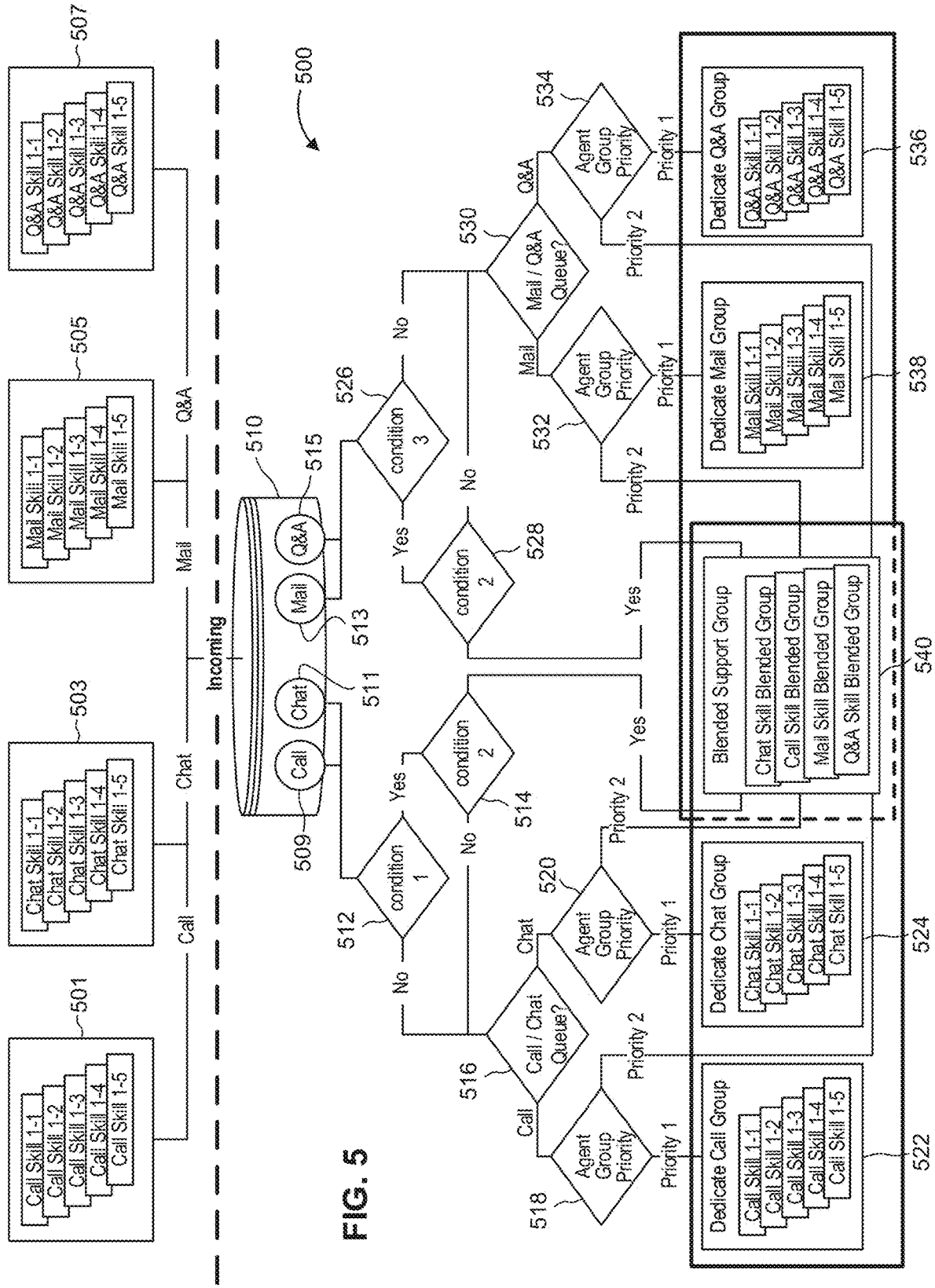
FIG. 5 depicts a flowchart illustrating how incoming inquiries or requests may be routed to the most appropriate customer service group or representative, consistent with the disclosed embodiments.

FIG. 5 depicts a flowchart illustrating how incoming inquiries or requests may be routed to the most appropriate customer service group or representative, consistent with the disclosed embodiments. Routing may include sending or forwarding an incoming request or inquiry to a customer service group or representative. The incoming request or inquiry may be presented to a user device associated with a representative, or may be placed in a group queue to be handled by a next available representative. Presenting the incoming request on a user device may include visual presentation such as displaying the request on a display, audible presentation including connecting to a call via a phone or headset, haptic presentation, or otherwise notifying a group or representative of an inquiry or request. A plurality of incoming customer requests or inquiries in the form of calls are shown at 501. The incoming calls 501 may be received from a land based telephone line, a cellular phone, a voice-over IP, or any other type of call that allows voice to be transmitted from one location to another. Incoming calls 501 may be from a plurality of different customers inquiring about a plurality of different situations. For example, a first call may be an inquiry about the shipping status of an order. Another call may be to discuss a product that arrived in a damaged condition. Yet another of the plurality of calls 501 may be to simply inquire about a product listing or get further information about an offered service. While these are merely examples, there is no limit on the reason or number of calls received by a customer support center. Illustrated at 503 are a plurality of incoming chat requests or inquiries. As discussed above in relation to the incoming calls, these chat inquiries may be related to a variety of different reasons. For example, a first chat may be inquiring about an estimated delivery time while a second chat is initiating the return of an item. A plurality of incoming emails or other text based electronic mailings are illustrated at 505. A plurality of incoming Q & A inquiries are illustrated at 507. As discussed above, the incoming emails 505 and Q & A's 507 may be associated with any type of customer request or inquiry.

Each of the incoming requests or inquiries are blended together to form a total queue 510. Blending may allow for all communication channels to operate on a single platform and may include making each type of request or inquiry recognizable, configurable, or searchable by at least one processor. This may be performed by integrating each of the customer communication channels (calls 501, chats 503, emails 505, Q & A's 507) using an application programming interface. Blending allows for each of the communication channels to operate on a single platform. Blending may include changing or modifying the data structure of each inquiry or request to include a common data structure that is recognizable, configurable, or searchable by system 300. In one aspect, each type (i.e. call, chat, email or mail, Q & A) of the incoming inquiries may be routed to a specific customer service group. In FIG. 5, call customer service group 522 receives all blended calls by default in a normal situation, chat customer service group 524 receives all blended chats by default in a normal situation, mail customer service group 538 receives all blended email and mail inquiries in a normal situation, and Q & A customer service group 536 receives all blended Q & A inquiries by default in a normal situation. A normal situation may be identified in relationship to a threshold. This threshold may be considered a normal value or a setting value. A normal situation may be indicative of a situation below or above a threshold depending on the metric. Some metrics may include AHT, number of customer service groups or representatives available, in process requests, total number of requests, number of dropped calls, change in response time, change in number of requests, etc. For example, if the AHT for all incoming call inquiries or chat requests is less than 1 minute, a normal situation exists. However, if the AHT for all incoming call inquiries or chat requests is greater than 1 minute, a normal situation does not exist and system 300 may look to route some of the incoming requests or inquiries to additional customer service groups or individuals. Additionally, a threshold may include a change in a parameter in a certain time period. For example, if the AHT for incoming requests or inquiries increases by a certain percent over a one minute time period, system 300 may initiate routing to additional customer service groups or representatives.

System 300 uses real-time data to aid in optimizing request or inquiry routing. Real-time data may include the number of customers waiting, the number of available customer service representatives, the average customer wait time to be connected with a customer service representative, average call waiting time, representative inactivity, percentage of active representatives, and other metrics that are useful in determining inquiry routing. The incoming inquiries may be automatically distributed according to a real-time data condition value, and routed based on the skill of the customer service group or individual customer service representative. For example, call customer service group 522 may be most suitable for receiving incoming call inquiries, while a specific member of call customer service group 522 may be most suitable to receive call inquiries related to defective items.

The incoming inquiries may be automatically distributed by system 300 according to a cumulative statistical data condition value and routed to a specific customer service group or specific member of the customer service group. System 300 may distribute the inquiries or requests over any wired or wireless communication channel. Cumulative statistical condition values may include, for example, 1 minute response rate gap difference between call and chat, or a call to chat ratio.

System 300 may automatically distribute the incoming requests and inquires according to a business rule. Business rules and other conditions may be stored in memory 310, database 306, or on server 304 and be accessible by processor 302 for applying to blended inquiries and requests. For example, a customer status may be considered a business rule. Some customers may be enrolled in a membership program or have another VIP status. Additionally, some customer requests or inquiries may be submitted by a blacklisted customer, or a customer having been flagged as a nuisance or problem in the past. Specially trained representatives may receive dedicated inquiries from these individuals.

Inquiries submitted by non-real time channels, such as emails 505, backend inquiries, or Q & A requests 507 may also be routed to a best possible customer service group or representative according to one or more rules or conditions. For example, incoming volume and number of remaining tickets processed by each channel may be a guiding factor as to where to send a request or inquiry. Additionally, the request or inquiry may be assigned based on the first-in-first out model. Furthermore, inquiries submitted by non-real time channels, such as email, backend inquiries, or Q & A requests may also be routed to a best possible customer service group or representative according to a ticketing processing lead time rule, such as, ticket processing lead time or agent distribution lead time. Ticket processing lead time may indicate the time between creating a ticket and closing the ticket upon completion of the inquiry or request. Agent distribution lead time may indicate the time between creating a ticket and when the ticket has been assigned to a customer service representative. A ticket may be created for each incoming inquiry or request when received by the system 300, or when added to the total queue 510.

Managers and agents may manage channels and skills of agents through a web page based application programmable interface in real time. This allows managers or other members of a customer support group to update available representatives and their corresponding skill sets. The status of each member in a customer service group may be available at the application programmable interface. Such status may include "in contact," "on standby," "away," "rest," "disabled," and "lunch break." Incoming inquiries may be assigned based on a customer service representative's status. For example, an inquiry may be directed to a representative having a status "standby" and not to an agent having a status "disabled." Additionally, all inquiry metrics may be available on the application programmable interface. For example, metrics related to incoming calls, chats, emails, or Q & A's may be displayed for viewing by a manager or member of a customer service group. The application programmable interface may allow for configuring of multiple productivity reports. For example, there may be an operational data search and reporting feature for each of the communication channels.

Each member of a customer service group may be associated with a specific skill or set of skills. These skills may be assigned a member based on historical data, such as number of requests or inquiries completed, number of months employed, or when having completed specific training. For example, a member may receive a specific skill level or classification after having completed conflict resolution training or conflict de-escalating training. The set of skills associated with each member of a customer service group may be ranked from greatest skill to least skill. Each of the skills may also be assigned as a main skill or a backup skill. Representatives may only receive incoming requests for their back-up skills if that skill is currently overwhelmed with requests or inquiries or the representative is sitting idle without any assigned inquiries to respond to, and may be updated regularly to reflect any new skill gained.

Incoming requests or inquires may receive prioritization by type, skill, source, channel, etc. that will determine routing and order of distribution to a customer service group or customer service representative. Some customer service representatives may only work on one request or inquiry at a time, while some instances may allow more than one, such as when conducting two chat inquiries. More than one inquiry may only be assigned to agents having a skill level commensurate with handling more than one request or inquiry. Skill sets for each customer service representative may be stored in memory 310, database 306, or on server 304, and may be searchable by processor 302. Skill sets or skill levels may be reflective of inquiry or request types handled, the number of requests handled, ratings, or reviews provided by customers, and may be updated regularly.

The application programmable interface may allow for manual assignment of requests or inquiries to a customer service group or representative. Incoming inquiries may be tagged with a required skill through artificial intelligence, interactive voice response, or filling out a form. Key words in a request may flag the request as a specific type of request. For example, the word "broken" may be identified in the request and the system may assign the request as a "return" type request.

In FIG. 5, the incoming requests or inquires which are associated with a real-time channel are incoming calls 509 and incoming chats 511. All incoming inquiries are blended or accumulated in the total queue 510 on a continuous basis and may be routed by a setting or baseline value. The setting or baseline value may be a threshold that indicates a normal operating parameter. The setting or baseline value may be modified by a manager and may be based on a variety of metrics associated with incoming inquires or request. Additionally, the setting or baseline value may indicate a category or type of the incoming inquiry or request. The requests or inquiries are not routed as a group, rather, each inquiry may be evaluated independently to determine the most suitable customer service group or representative to receive the inquiry. Each of the blended requests or inquires may be evaluated in turn based on a time stamp when the inquiry was received. This would be similar to a first-in-first-out type analysis, wherein the oldest inquiry is the first to be analyzed and routed to an appropriate customer service group or member. In another aspect, other rules or conditions may determine an order for evaluation of the blended inquiries. For example, incoming calls 509 may have priority over chats 511 or mail inquiries 513, and may be routed first.

At 512 it is determined whether or not the blended call inquiries 509 or blended chat inquires 511 meet a setting or baseline value. As discussed above, the setting or baseline value may indicate a normal operating parameter or category of request. For example, the setting or baseline value may indicate when the difference of response rate for a call or chat channel for one minute is more than 5%. In this example, if the call response rate is 87% and the chat response rate is 92%, then flow routing for the call channel may be activated and the decision process moves to 514 where the number of available blended support group agents or representatives are identified. If there is an available representative to receive the blended call inquiry, the call inquiry may be forwarded to the appropriate member of the blended support group 540. The inquiry may be assigned to the first available customer service representative in the blended support group 540, or may be assigned to a representative having a specific skill set commensurate with a category, or required skill identified in the request. At 512, determining whether or not the blending inquiries or request meet a setting or baseline value may include comparing real-time data associated with incoming inquires or requests stored in memory 310, database 306, or server 304 to accumulated statistical data associated with the incoming inquiries or requests. Real-time data may include the number of customers waiting to be connected to a customer service representative, the presence of available customer service representatives, the average customer waiting time, the average time a customer is interacting with a customer service representative to fulfill an inquiry or request, and other data associated with active inquiries. Statistical data may include one minute response rate gap, percentage of inquiries related to each communication channel, or other data associated with statistical information related to completed inquiries or requests.

If the processor 302 determines that the blended call inquiries 509 or blended chat inquiries 511 do not meet the setting or baseline value at 512, the analysis proceeds to 516 where the blended inquiry may be initially assigned to a queue for an appropriate customer service group. For example, a blended call may be initially assigned a queue for call customer service group 522 and a blended chat may be assigned a queue for a chat customer service group 524. At 518 and 519, a check for an available customer service group or representative having priority to address the blended call request or blended chat request, respectively, may be performed. A customer service group or representative may be identified as available by checking the status associated with a group or representative, or by analyzing data related to incoming requests or inquires already assigned to a group or representative. Determining priority of a customer service group or representative may include comparing the category or type of call or chat inquiry to the skill set associated with the customer service group or representative stored in memory 310, database 306, or on server 304. If a representative having an appropriate skill set is available in the group associated with the blended request or inquiry (i.e. the call customer service group 522 will handle call inquiries and the chat customer service group 524 will handle chat inquiries), then, the request or inquiry may be assigned to that representative. Alternatively, the inquiry or request may be assigned to a service group and be placed in a queue to be answered by the first available member of the service group. If it is determined that no representative for the corresponding service group is available or has the appropriate skill set to handle the inquiry, then the request or inquiry may be forwarded to the blended service group 540. The request or inquiry may be placed in a queue to be received by the next available representative or assigned to a specific member of the blended service group 540 based on a required skill set.

In FIG. 5, the incoming inquires which are associated with non-real-time channels are incoming mail inquiries 513 and incoming Q & A inquiries 515. As previously discussed, all incoming requests or inquiries are blended or accumulated in the total queue 510 and are routed by a setting or baseline value. The requests or inquiries are not routed as a group, rather, each request or inquiry may be evaluated independently to determine the most suitable customer service group or representative to receive the inquiry. Each of the blended inquires may be evaluated in turn based on a time stamp when the inquiry was received. This would be similar to a first-in-first-out type analysis, wherein the oldest inquiry is the first to be analyzed and routed to an appropriate customer service group or representative. In another aspect, other rules or conditions may determine an order for evaluation of the blended inquiries.

At 526 the processor determines whether or not the blended mail inquiries 513 or blended Q & A inquires 510 meet a setting or baseline value that may indicate a normal operating parameter. For example, the setting or baseline value may indicate if difference in lead time between mail and Q & A channels accumulated in the total queue 510 is more than a predetermined time period, for example 30 minutes. In this example, if the mail queue is 7 hours, and the Q & A queue is 6 hours and 30 minutes, then flow routing for the mail channel may be activated and the decision process moves to 528 where the number of available blended support group representatives are identified. If there is not a difference in at least 30 minutes, then there is no flow routing. In the case of flow routing, if there is an available agent or representative to receive the blended mail inquiry, the mail inquiry may be forwarded to the appropriate representative of the blended support group 540. The inquiry may be assigned to the first available customer service representative in the blended support group 540, or may be assigned to a representative having a specific skill set. Likewise, if the Q & A queue has a lead time greater than 30 minutes relative to the mail queue, the Q & A inquiry may be routed in a similar manner to the blended support group 540.

If the processor 302 determines that the blended mail inquiries or request 513 or blended Q & A inquiries or requests 510 do not meet the setting or baseline value at 526, the analysis proceeds to 530 where the blended inquiry may be initially assigned to a queue for an appropriate customer service group. For example, a blended mail inquiry may be initially assigned a queue for mail customer service group 538 and a blended Q & A inquiry may be assigned a queue for a Q & A customer service group 536. At 532 and 534, a check for an available customer service group or representative having priority to address the blended mail request or blended Q & A request, respectively, may be performed. A customer service group or representative may be identified as available by checking the status associated with a group or representative, or by analyzing data related to incoming requests or inquires already assigned to a group or representative. Determining priority of a customer service group or representative may include comparing the category or type of mail or Q & A inquiry to the skill set associated with the customer service group or representative stored in memory 310, database 306, or on server 304. If a representative having an appropriate skill set is available in the group associated with the blended request or inquiry (i.e. the mail customer service group 538 will handle email and mail inquiries and the Q & A customer service group 536 will handle Q & A inquiries), then, the request or inquiry may be assigned to that representative. Alternatively, the inquiry or request may be assigned to a service group and be placed in a queue to be answered by the first available member of the service group. If it is determined that no representative for the corresponding service group is available or has the appropriate skill set to handle the inquiry, then the request or inquiry may be forwarded to the blended service group 540. The request or inquiry may be placed in a queue to be received by the next available representative or assigned to a specific member of the blended service group 540 based on a required skill set.

Figure 6:
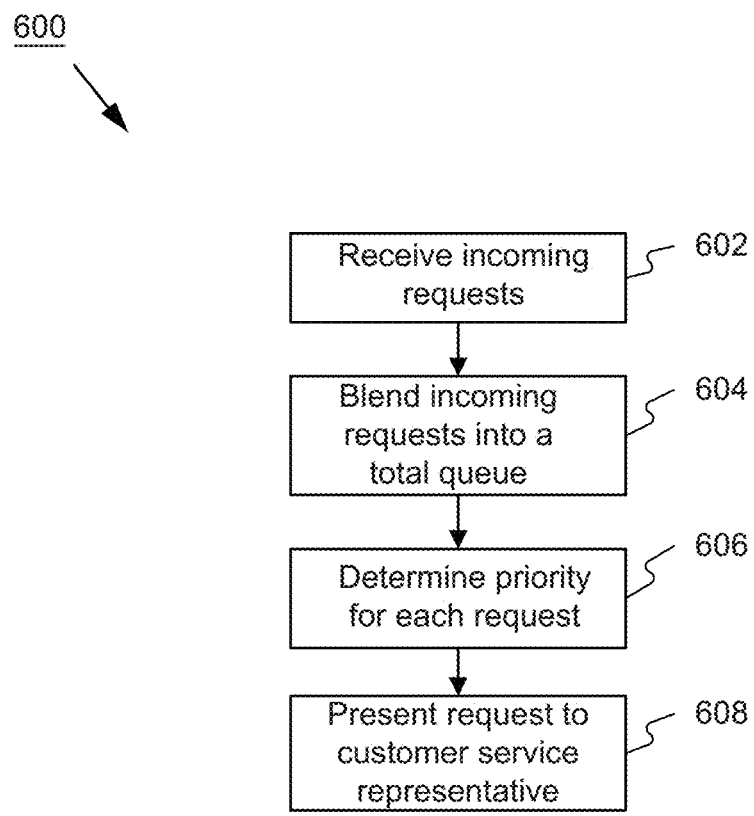
FIG. 6 illustrates a method for routing incoming customer requests or inquiries to a most appropriate customer service group or representative, consistent with the disclosed embodiments.

FIG. 6 illustrates a method 600 for routing incoming customer requests to a most appropriate customer service group or representative. The method may be performed by at least one processor in system 100 or system 300. For example, external front end system 103 may be configured to perform method 600 and act as an interface between customers and a customer service center. In step 602, a plurality of customer calls from and a plurality of customer chat sessions are received. The calls and chat sessions may be collectively referred to as customer requests or inquiries and may be considered real-time communication channels. These inquiries may be related to any communication between customer and business entity in order to perform business. For example, the inquiries may be related to purchasing an item or service, returning an item or service, requesting a replacement item, receiving information, filing a warranty claim, submitting reviews, or any other business related request or inquiry. The requests or inquiries may be received at a customer service center. Customers may initiate an inquiry using a mobile device 102A, computer 102B, or other communication device such as a land based phone. The inquiries may be received in a central customer service center, or may be received remote of a plurality of geographical spaced customer service centers connected to one another by a variety of communication networks. Other types of inquiries may also be received at step 602. For example, email, mail, or Q & A requests may be received. These communication channels may be considered non-real time as they may be addressed by a customer service agent at a later time.

At step 604, system 300 may blend the received plurality of customer calls and the received plurality of customer chat sessions into a total queue for presentation to at least one user device. Additionally, all received non real-time inquires may be blended into the total queue. The total queue may be stored in memory 310, database 306, or on sever 304 and accessible to one or more software programs or applications. Blending of all inquiries allows for all communication channels to operate on a single platform and may include making each type of request or inquiry recognizable, configurable, or searchable by at least one processor. For example, each of the different types of inquiries may be integrated by software, an application, or an application programmable interface arranging each inquiry by time received. Blending may include changing or modifying the data structure of each inquiry or request to include a common data structure that is recognizable, configurable, or searchable by system 300. Time stamps for each of the incoming inquires may be made to indicate the time of their arrival in system 300. The total queue is continuously updated as new requests or inquiries are made by customers. Blending all incoming inquiries allows for efficient handling and processing of each incoming request. Presentation to at least one user device may include sending an incoming or blended inquiry to a headset, phone, computer, mobile device, or other computing device associated with a customer service representative. Any request or inquiry may be sent to multiple user devices. For example, a display associated with a manager may present active inquires being handled by each active customer service representative.

At step 606, at least one processor may determine a respective priority for each of the blended plurality of customer calls and the blended plurality of customer chat sessions. The at least one processor may also determine a respective priority for each of the blended mail, email, and Q & A inquiries as well. Determining priority of the blended plurality of customer calls, blended customer chat sessions, blended mail or email requests, and blended Q & A inquiries may include applying at least one rule or condition. The at least one rule or condition may be associated with a response rate, response time, wait time, number of attempts, volume of customer chat sessions, volume of customer calls, volume of email or mail requests, volume of Q & A requests, representative availability, representative skill set, status of representative, or type of request. In one aspect, a category for each of the requests or inquiries may be associated with the request or inquiry. For example, the blended plurality of customer calls and the blended plurality of customer chat sessions may include a category related to the type of request such as urgent, refund, return, warranty, information, purchase, or any other category. Additionally, a category may be related to a customer type. For example, a request from a customer having VIP status may indicate as much. Other customer types may include blacklisted, new, subscriber, or any other category of customer.

Once priority is determined, at step 608 at least one of the blended plurality of customer calls, blended customer chat sessions, blended email or mail inquiries, or blended Q & A inquiries is sent to at least one user device associated with a customer service group or member of the customer service group (i.e. a customer service representative). The at least one inquiry may be sent over any wired or wireless communication network. The at least one user device may include an output device such as a visual display, tactile output device, or audible output device such as a speaker. The at least one user device may include an input device such as a microphone, mouse, pressure sensitive pad, or keyboard. In one aspect, at least one user device may include a personal computer, a laptop, mobile communications device, or other interface.

Routing the blended requests or inquiries to an appropriate customer service group or customer service representative may include sending to the at least one user device at least one of the blended plurality of customer calls, blended plurality of customer chat sessions, blending email or mail inquires, or Q & A inquiries to a user device associated with a representative having a skill set specific to the at least one of the blended plurality of customer calls and plurality of customer chat sessions. In this way, the most qualified service group or customer service agent may be assigned an incoming inquiry.

In another aspect, feedback may be received from the at least one user device associated with a representative. Feedback may include data associated with responding to requests or inquiries, such as the number of requests or inquiries handled by the representative in a predetermined time period, the amount of time the representative spends during inquiries, the category of requests or inquires assigned to the representative. Feedback may also include any input received directly from the representative for example by answering a questionnaire or providing answers to questions. Additionally, feedback may include biofeedback from the representative received from one or more sensors that provide physiological information, such as heartbeat, blood pressure, or body temperature. Furthermore, facial recognition software or voice recognition software may be used to monitor a representative while responding to requests or inquires. Using the feedback, at least one of a mental state or physical state of a representative associated with the user device may be determined. For example, it may be determined from the feedback that a representative is fatigued or ill. Conversely, it may be determined that the representative is fully aware or healthy. Regardless, such information may be useful when routing inquiries to a most suitable representative.

Based on the determined mental state or physical state, at least one of the blended plurality of customer calls, customer chat sessions, email or mail inquiries, or Q & A inquiries may be sent to at least one user device. For example, a representative that is fatigued may be ill-suited to respond to real-time inquires such as calls or chats, but may be better suited to responding to non-real-time inquiries. In this case, blended calls and chats may be directed to a different representative that appears to be in a better mental state or physical state. Such feedback may additionally be useful in determining the long-term suitability for employment as a customer representative.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs and logic based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for routing incoming customer requests, comprising:
    memory comprising instructions; and
    at least one processor configured to execute the instructions to perform steps comprising:
        receiving a plurality of customer inquiries from at least two different communication channels, the plurality of customer inquiries including at least two different types of inquiries;
        blending the received plurality of customer inquiries into a total queue by integrating each of the communication channels;
        comparing data associated with the plurality of customer inquiries to statistical data to determine a respective priority for each of the blended plurality of customer inquiries;
        sending, based on the determined priority, at least one of the blended plurality of customer inquiries to at least one user device; and updating stored information of a customer service representative associated with the at least one user device.

2. The computer-implemented system according to claim 1, wherein comparing data comprises applying at least one rule or condition.

3. The computer-implemented system according to claim 2, wherein the at least one rule or condition is associated with a response rate, response time, wait time, number of attempts, volume of customer chat sessions, volume of customer calls, or type of request.

4. The computer-implemented system according to claim 1, wherein the at least one processor is further configured to execute the instructions to perform steps comprising:
associating the at least one of the blended plurality of customer inquiries with a category; and
wherein the sending to the at least one user device includes sending the at least one of the blended plurality of customer inquiries to a user device associated with a representative associated with the category.

5. The computer-implemented system according to claim 4, wherein the category includes a customer type.

6. The computer-implemented system according to claim 1, wherein blending the received plurality of customer inquiries into a total queue further comprises:
routing the plurality of customer inquiries by a setting or baseline value, wherein the setting or baseline value indicates a normal operating parameter.

7. The computer-implemented system according to claim 1, wherein the plurality of customer inquiries comprises at least one customer call, customer chat session, electronic message, or Q & A inquiry.

8. The computer-implemented system according to claim 1, wherein updating stored information of the customer service representative comprises updating a skill set of the customer service representative.

9. The computer-implemented system according to claim 1, wherein sending to the at least one user device includes sending the at least one of the blended plurality of customer inquiries to a user device associated with a representative having a skill set specific to the at least one of the blended plurality of customer inquiries.

10. The computer-implemented system according to claim 1, wherein the at least one processor is further configured to execute the instructions to perform steps comprising:
receiving feedback from the at least one user device;
determining, from the feedback, at least one of a mental state or physical state of a representative associated with the user device; and
sending, based on the at least one of the mental state or the physical state, at least one of the blended plurality of customer inquiries to the at least one user device.

11. A computer-implemented method for routing incoming customer requests, comprising:
receiving a plurality of customer inquiries from at least two different communication channels, the plurality of customer inquiries including at least two different types of inquiries;
blending the received plurality of customer inquiries into a total queue by integrating each of the communication channels;
comparing real-time data associated with the plurality of customer inquiries to statistical data to determine a respective priority for each of the blended plurality of customer inquiries;
sending, based on the determined priority, at least one of the blended plurality of customer inquiries to at least one user device; and
updating stored information of a customer service representative associated with the at least one user device.

12. The computer-implemented method according to claim 11, wherein comparing data comprises applying at least one rule or condition.

13. The computer-implemented method according to claim 12, wherein the at least one rule or condition is associated with a response rate, response time, wait time, number of attempts, volume of customer chat sessions, volume of customer calls, or type of request.

14. The computer-implemented method according to claim 11, further comprising:
associating the at least one of the blended plurality of customer inquiries with a category; and
wherein the sending to the at least one user device includes sending the at least one of the blended plurality of customer inquiries to a user device associated with a representative associated with the category.

15. The computer-implemented method according to claim 14, wherein the category includes a customer type.

16. The computer-implemented system according to claim 11, wherein blending the received plurality of customer inquiries into a total queue further comprises:
routing the plurality of customer inquiries by a setting or baseline value, wherein the setting or baseline value indicates a normal operating parameter.

17. The computer-implemented method according to claim 11, wherein the plurality of customer inquiries comprises at least one customer call, customer chat session, electronic message, or Q & A inquiry.

18. The computer-implemented method according to claim 11, wherein updating stored information of the customer service representative comprises updating a skill set of the customer service representative.

19. The computer-implemented method according to claim 11, wherein sending to the at least one user device includes sending the at least one of the blended plurality of customer inquiries to a user device associated with a representative having a skill set specific to the at least one of the blended plurality of customer calls and plurality of customer chat sessions.

20. The computer-implemented method according to claim 11, further comprising:
receiving feedback from the at least one user device;
determining, from the feedback, at least one of a mental state or physical state of a representative associated with the user device; and
sending, based on the at least one of the mental state or the physical state, at least one of the blended plurality of customer inquiries to the at least one user device.

* * * * *